United States Patent

[11] 3,596,172

| | | |
|---|---|---|
| [72] | Inventor | Gerald S. Harrison<br>Plainview, N.Y. |
| [21] | Appl. No | 837,044 |
| [22] | Filed | June 27, 1969 |
| [73] | Assignee | Lear Siegler, Inc.<br>Melville, N.Y. |

[54] BUCK-BOOST PULSE-WIDTH-MODULATED LINE REGULATOR
5 Claims, 7 Drawing Figs.

[52] U.S. Cl............................................. 323/45, 323/62
[51] Int. Cl............................................. G05f 1/30
[50] Field of Search........................... 323/6, 19, 22 T, 23, 24, 45, 62

[56] References Cited
UNITED STATES PATENTS

| 3,129,380 | 4/1964 | Lichowsky | 323/45 |
| 3,281,652 | 10/1966 | Perrins | 323/19 |
| 3,363,143 | 1/1968 | Cavanaugh | 323/24 UX |
| 3,490,030 | 1/1970 | Kelley, Jr | 323/45 X |

Primary Examiner—J D. Miller
Assistant Examiner—A D Pellinen
Attorney—Darby and Darby ABSTRACT: An AC regulator controls the voltage applied to a load by using pulse-width-modulated correction signals. Any deviation of load voltage from that desired is sensed and converted to pulse-width-modulated signals. These signals switch alternate halves of a secondary winding of a transformer connected in a buck-boost arrangement. The net voltage applied to the secondary winding is a function of the pulse-width modulation and a net correction voltage is coupled to the primary winding which is series connected between line and load. The invention also has application to line transient generation because of the overall high speed of response of the circuit.

INVENTOR
GERALD S. HARRISON

BY Darby & Darby

ATTORNEYS

INVENTOR
GERALD S. HARRISON

BY Darby & Darby
ATTORNEYS

BUCK-BOOST PULSE-WIDTH-MODULATED LINE REGULATOR

This invention relates to AC line regulators and, more particularly, to AC regulators using pulse-width modulated correction signals to drive a buck-boost transformer arrangement.

Although AC regulators are known in the prior art, such circuits generally suffer from excessive complexity, power inefficiency or slowness of response or some combination of all three of these limitations.

By eliminating these prior art difficulties, particularly the slowness of response, the regulator of the present invention has great flexibility in controlling the output to a given load. The regulator cannot only control the shape of the envelope of AC voltage supplied to the load but, because of its rapid response, can also control the shape of individual cycles of supplied AC power. Thus, in addition to solving the basic line regulation problem, it can also be used to generate rapid line transients or a modulated output with desired high frequency envelope.

It is an object of this invention, therefore, to provide a highly efficient AC voltage regulator capable of delivering high power to a load.

Another object is to provide an AC voltage regulator capable of high speeds of response.

A further object is to provide a circuit capable of delivering predetermined line transients to a load.

An additional object is to provide a circuit capable of modulating an AC output with a predetermined envelope having substantial high frequency energy content.

The AC voltage regulator of the invention produces a predetermined magnitude AC output voltage, the regulator having input terminals for receiving an AC voltage to be regulated and output terminals to which a load is to be connected for receiving the regulated output voltage. The regulator comprises a transformer, having a primary winding series-connected between one terminal of the regulator input and one output terminal and having a center-tapped secondary winding, the center tap connected to the one regulator input terminal and means for comparing the voltage at the regulator output terminals with a predetermined reference signal and for producing complementary pulse-width modulated error signals in response to said comparison. Also included are complementary switch means, responsive to the pulse-width modulated error signals, a respective one of the switch means connected to a point on each side of the center tap of the secondary winding, for alternately switching each point of the secondary to a common potential point of said regulator, each connected portion of the winding between a respective point and the center tap providing a respective buck or boost voltage to the primary winding determined by the pulse widths of the error signals applied to the complementary switch means to produce a voltage correction signal across the transformer primary and provide the predetermined output voltage to the regulator output terminals.

For a better understanding of the present invention together with other and further objects thereof reference is made to the following description taken in connection with the accompanying drawings and the scope of the invention will be pointed out in the appended claims.

In the drawings, FIG. 1 illustrates a schematic block diagram of the present invention;

Figure 1:
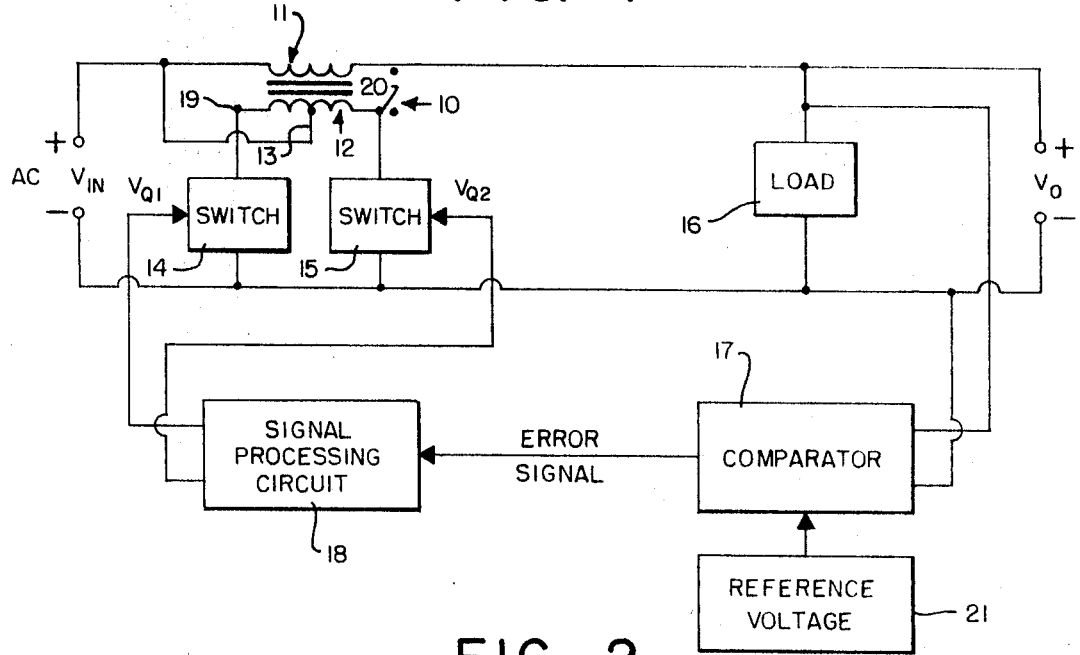

Referring first to FIG. 1, an overall block diagram of the present invention is shown. An AC voltage which is to be regulated is applied to the input terminals and is designated $V_{IN}$. Connected to the input voltage high (+) terminal is one end of the primary winding 11 of a transformer 10. The other side of the primary winding is connected to the high terminal of a load 16. The output voltage of the regulator is developed across load 16 and is designated by $V_O$. Transformer 10 has a center-tapped secondary 12. The center tap 13 is connected to the high side terminal of the input voltage while the ends 19 and 20 of the secondary are connected to respective switches 14 and 15. These switches are shown connected to the circuit common which is the (−) input voltage terminal.

The circuit of FIG. 1 so far described is commonly referred to as a buck-boost arrangement. Any voltage appearing between end 19 of the transformer secondary winding and center tap 13 will cause an in phase voltage to appear across primary 11 and which will add to the input signal $V_{IN}$. An out of phase voltage will appear across primary 11 when applied between secondary winding terminal 20 and center tap 13 and will subtract from the input $V_{IN}$. Thus, appropriate application of voltage to the proper secondary half winding will create a net change in voltage appearing across the load 16 depending on whether the voltage across primary 11 adds to or subtracts from the input voltage $V_{IN}$.

The voltage appearing across load 16 is supplied to a comparator 17. The output voltage or a portion thereof is compared with a predetermined voltage reference from a source 21 and, depending on the deviation of the output voltage from the reference, an error signal is produced having a certain magnitude. This error signal is supplied to signal processing circuit 18 which translates this error signal into two pulse-width modulated signals of opposite phase. These signals are used to selectively drive switches 14 and 15. These two pulse-width modulated signals applied to the switches are designated as $V_{Q1}$ and $V_{Q2}$. A more detailed explanation of the elements constituting blocks 17 and 18 is given below with respect to FIGS. 5A and 5B.

The circuit shown in FIG. 1 is a closed loop feedback circuit which senses the output developed across a load, compares it to a reference signal, and produces a particular form of feedback error signals, in this case pulse-width modulated signals, which are used to supply a correction signal through a buck-boost transformer arrangement.

Figure 2:
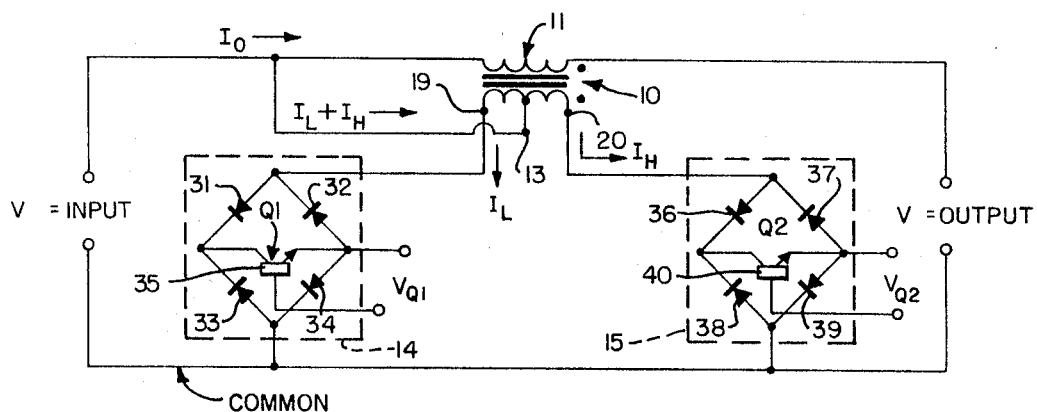
FIG. 2 shows a schematic representation of a preferred switch arrangement for use in accordance with the present invention.

Referring now to FIG. 2 the switching of the secondary winding 12 of transformer 10 is described in a preferred circuit arrangement. The two ends of secondary winding 12 re connected to the switches 14 and 15 which alternately switch winding ends 19 and 20 to the circuit common. Switch 14 is a diode quad comprising diodes 31, 32, 33 and 34 while switch 15 is a diode quad formed by diodes 36, 37, 38 and 39. The diode quads are connected in a bridge type circuit so that no current would normally flow in the respective circuits between terminal 19 and common or between terminal 20 and common. A transistor switch Q1 or Q2 is connected across the respective quad with the collector connected to common diode cathodes of one pair of diodes and the emitter of a respective transistor connected to the common diode anodes of the other pair of diodes forming the respective quad.

When a forward bias voltage is applied between the base and the emitter of transistor Q1 of the correct polarity to turn the transistor "on" (for the NPN structure shown it would require a base voltage to be positive with respect to the emitter voltage) then current may flow from winding end 19 through diode 31, through transistor Q1 from collector to emitter, and then through diode 34 to common. A similar action occurs in switch 15 with regard to transistor Q2 when the base is forward biased to permit current to flow from winding end 20 to common. When the base-emitter junction of a transistor is reverse biased, that is, the base is negative with respect to the emitter for an NPN configuration, the particular diode quad would be essentially open circuited and no current could flow between winding end 19 and common or between winding end 20 and common.

The current flowing from winding end 19 to common is designated by $I_L$ and the current flowing from winding end 20 to common is designated by $I_H$. The sum of these two currents flows through the connection between the input voltage high terminal and center tap 13 of transformer secondary 12 and is designated "$I_L+I_H$." The current flowing through transformer primary 11 is designated $I_0$.

Figure 3:
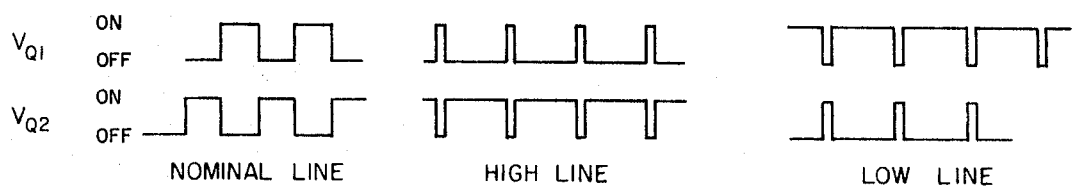
FIG. 3 illustrates the switching voltage applied to the switches illustrated in FIG. 2 under different conditions of error signals produced by different line conditions.

FIG. 3 shows the typical switching voltages which are applied to $V_{Q1}$ and $V_{Q2}$ from base to emitter. It should be noted that these voltages must be floating with respect to the circuit common for the transistor to switch properly. The frequency of the switching voltage is generally much higher than the frequency of the line voltage to be regulated. The two voltage waveforms $V_{Q1}$ and $V_{Q2}$ are necessarily of opposite phase and are indicated as such in FIG. 3.

If the load voltage were precisely the same as the input voltage there would be no error signal produced by comparator 17 to cause addition or subtraction from the input voltage. This is indicated by the nominal line condition in FIG. 3. It is seen that the periods of "on" and "off" time for each switch are equal so that there is no net voltage which adds or subtracts from the input voltage and the input voltage and the output voltage are the same.

In the case where the line $V_{IN}$ is high with respect to a given reference voltage supplied to the comparator 17, there is a net cancelling voltage to reduce the voltage at the load to the desired amount. Therefore transistor Q2 and switch 15 must be "on" for a longer time than transistor Q1 and switch 14 since it is switch 15 which provides the buck voltage. Since the switches operate out of phase then switch 14 must necessarily be "off" for the same portion of time that switch 15 is "on" and this is indicated by the high line condition of FIG. 3. A similar description applies to the low line condition and is shown in FIG. 3. Here, Q1 must be on for a longer time than Q2. It should be understood that the pulse widths $V_{Q1}$ and $V_{Q2}$ are variable.

Figure 4:
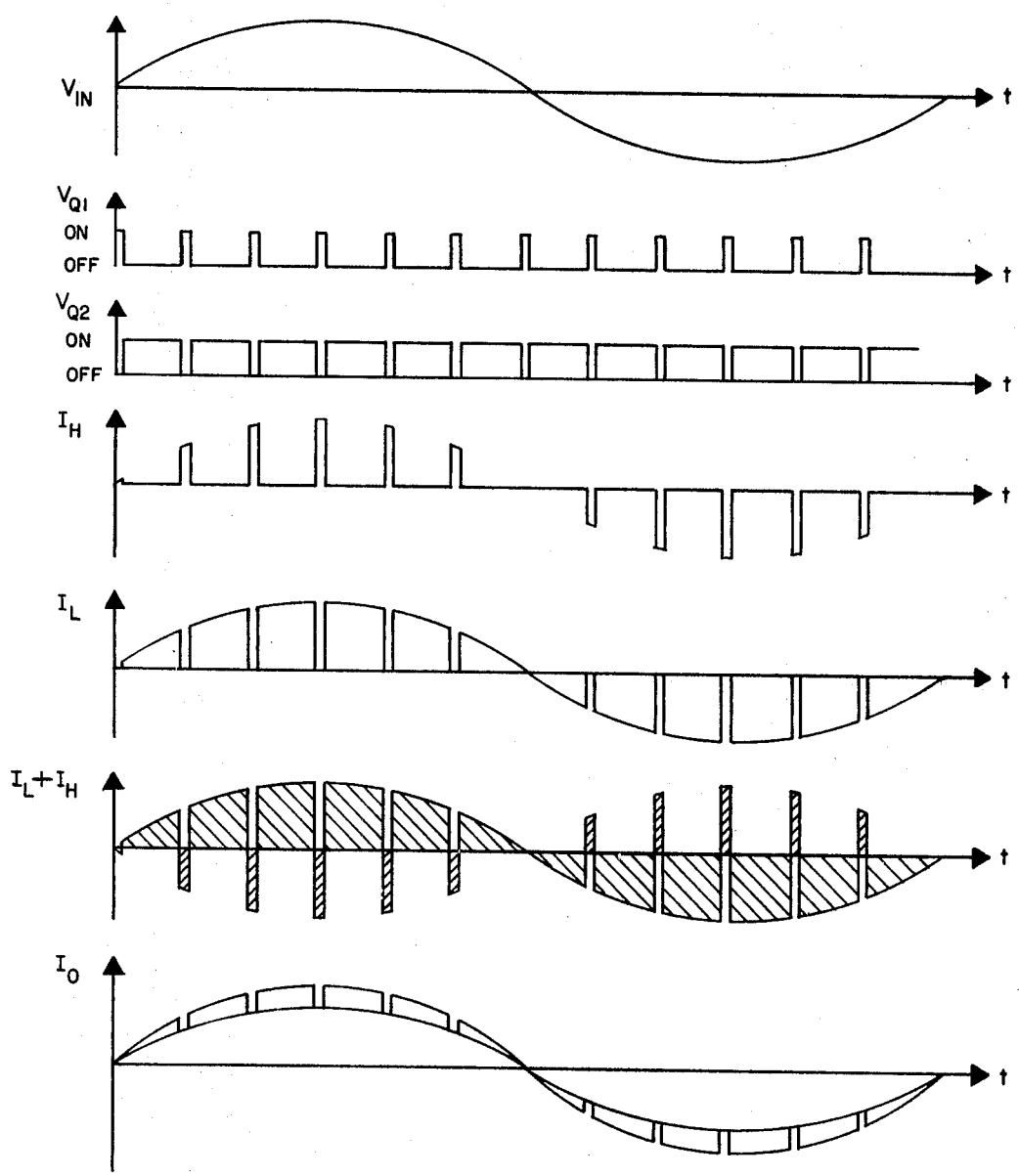
FIG. 4 illustrates the waveforms of voltage and current present in various portions of the circuit during operation of the present invention.

Referring to FIG. 4 a more complete understanding of the waveforms of both voltage and current may be had for the high line condition during which a bucking current ($I_L$) is to be produced. The line input voltage cycle is shown by the $V_{IN}$ waveform. The waveforms of $V_{Q1}$ and $V_{Q2}$ are similar to that shown for the high line condition in FIG. 3. The average current for $I_H$, produced by Q1 being "on", is quite small since only very narrow pulses of current appear. On the other hand, the $I_L$ average current, produced by Q2 being "on" for longer periods of time is quite large since it is essentially a complement of the $I_H$ current. The "$I_L+I_H$" total current, which flows through the center tap 13, is also shown. The average $I_L$ current is transformed by one half of secondary 12 to the primary 11, while the average $I_L$ current is transformed by the other half of the secondary 12 to primary 11. Since the average $I_L$ current is greater than the average $I_H$ current the net current flow $I_0$ through primary winding 11 is a cancelling, or bucking current. This will cause the voltage across the primary winding to subtract from the input voltage $V_{IN}$ for the desired voltage to be achieved at the load.

Figure 5A:
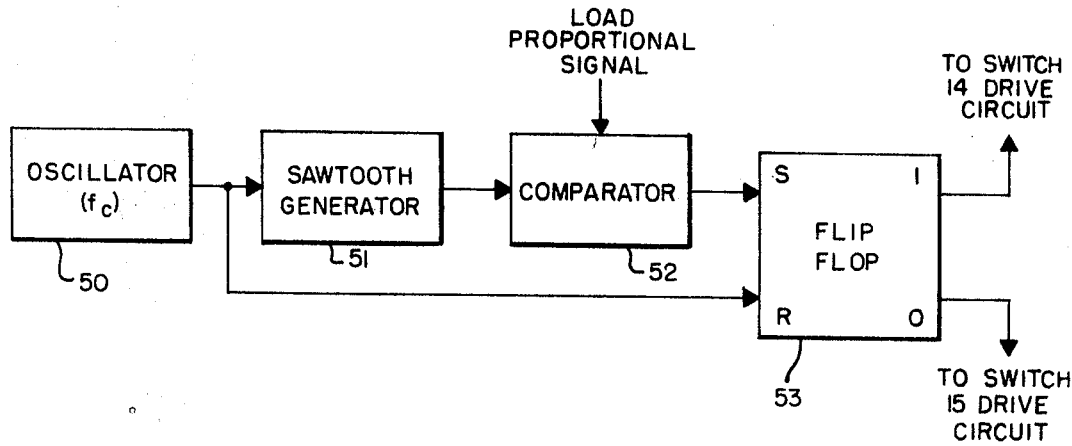
FIGS. 5A and 5B are two alternative circuits for producing signals to drive the output switches shown in FIGS. 1 and 2.
Figure 5B:
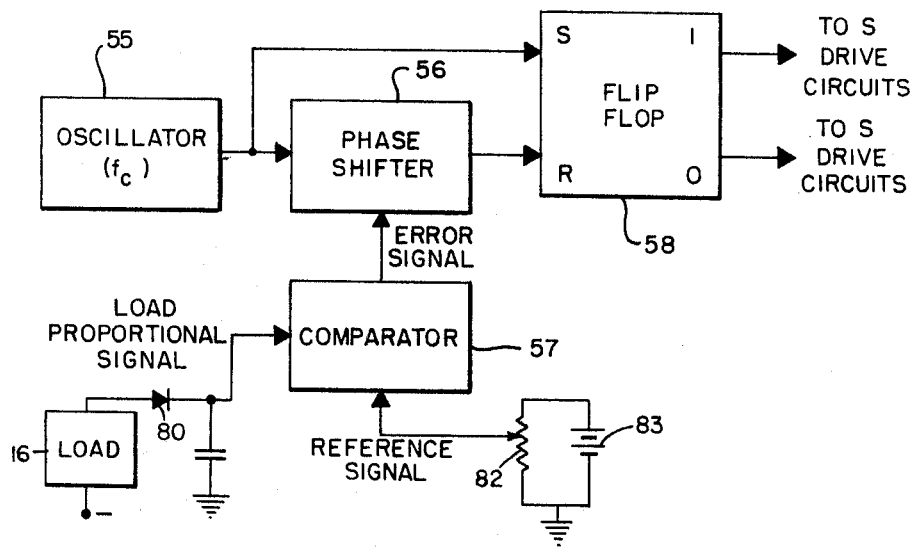

Two circuits for generating the out of phase pulse-width modulated drive signals necessary to actuate switches 14 and 15 are shown in FIGS. 5A and 5B. In FIG. 5A, an oscillator 50, which can be a multivibrator, provides a square wave output of a particular frequency, $f_c$, to sawtooth generator 51 which may typically be an integrator circuit. The sawtooth output waveform of generator 51 is supplied to a comparator 52, such as a Schmitt trigger. A DC signal is derived from the output signal by a rectifier or other appropriate circuit. In the comparator 52, the signal proportional to the output voltage is compared to the sawtooth waveform from generator 51. The comparator has an internal reference threshold which may be made adjustable. The signal which is proportional to the load biases the sawtooth waveform either higher or lower in comparison with the threshold of the comparator. The comparator 52 would normally be biased so that for a nominal line condition, the DC voltage derived from the output voltage would bias the sawtooth waveform so that half the sawtooth waveform would exceed the reference threshold of the comparator. Thus the comparator would supply a square wave output of 50 percent duty cycle for this condition. When the output proportional signal is small, as for a low line condition, the DC signal proportional to the output voltage will bias the sawtooth waveform so that only the tops of the sawtooth waveform exceed the threshold level and the comparator will provide a repetitive narrow pulse at the frequency of $f_c$. When the output proportional signal is high as for a high line, the sawtooth waveform will be biased higher and the comparator output pulses will consequently be wider. The comparator output is used to set flip-flop 53. The reset signal comes from oscillator 50. Flip-flop 52 provides two complementary output signals which are supplied to the drive circuits for switches 14 and 15. These complementary signals have a pulse width proportional to the error signal produced when the output proportional signal is compared with the comparator threshold.

Another circuit for producing the control signals for switches Q1 and Q2 is shown in FIG. 5B. Oscillator 55, which can be a multivibrator as oscillator 50, again produces a square wave output of frequency $f_c$. The load proportional signal, typically a DC signal, produced in the manner previously described by a rectifier 80 connected to load 16, is compared with a DC reference signal, produced by any suitable source such as a potentiometer 82 operating with a source of DC voltage 83, in comparator 92; which may be an operational amplifier, to produce an error signal. The error signal is used to control a phase shifter 56 which introduces phase shift in accordance with the magnitude of the error signal. This may be done by means of an active phase shift device whose gain is controlled by the error signal. The change in gain changes the phase shift. The phase shifted waveform resets flip-flop 58, while the square wave out of oscillator 55 is used to set the flip-flop. The outputs of flip-flop 58 are again complementary pulse-width modulated output waveforms which drive switches 14 and 15.

Figure 6:
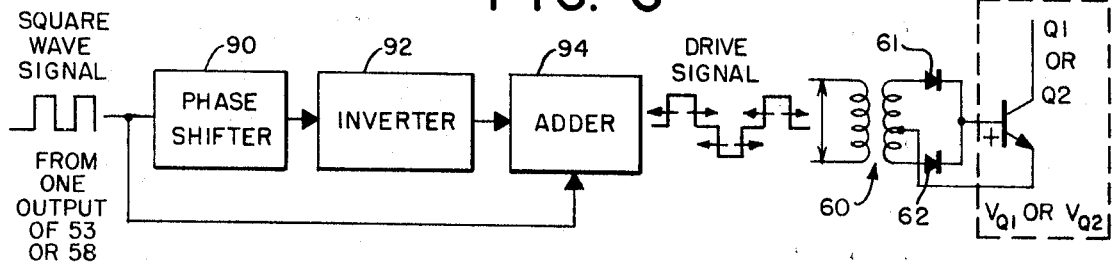
FIG. 6 is a schematic diagram of a preferred drive circuit for switching transistors Q1 and Q2.

The flip-flop outputs of the circuits of FIGS. 5A and 5B are normally transformer-coupled to actuate transistors Q1 and Q2. In situations where there may be difficulty in delivering a pulse-width modulated wave having large duty cycle through a drive transformer, the circuit of FIG. 6 can be used. The drive signal shown here to actuate a given transistor is produced by first phase shifting one of the flip-flop output signals of FIG. 5A or 5B in a phase shifter 90. The phase shifted signal is inverted in an inverter 92; the resultant inverted signal is added to the original signal in an adder circuit 94. This is applied to the primary of drive transformer 60, and the full wave rectifier comprising the drive transformer secondary and the diodes 61 and 62 enable a greater effective duty cycle to be transformed to the base of transistor Q1 or Q2.

The waveforms shown in FIG. 4 assume that transformer 10 has a flat frequency response from the line frequency, $f_1$, to all significant harmonics of the chopping frequency, $f_c$. This is not required nor in many cases is it desirable. If the band-pass of transformer 10 is limited or if appropriate filters are placed at transformer terminals 19 and 20 with respect to common, then the chopping frequency, $f_c$, will not appear at the output. This may be shown by the following. Considering the frequency components in a waveform such as $I_L+I_H$ in FIG. 4, such a waveform has a component at the line frequency of the form $$C_1 \frac{\left(T_1 - \frac{T}{2}\right)}{\frac{T}{2}} \sin 2\pi f_1 t$$

where $C_1$ is a function of a transformer turns ratio; $t$ is the period of the line voltage; and $T_1$ is the "on" pulse-width.

This component becomes 0 when $T_1=T/2$ and has a maximum when $T_1=0$ or $T_1=T$. This waveform also has components at and above the chopping frequency.

These are of the form:

$$E(n)\left[1-\frac{\left|T_1-\frac{T}{2}\right|}{\frac{T}{2}}\right]\sin\left(2\pi f_1 t \pm 2\pi n f_c t\right)$$

where $n=1, 2....$

These components become 0 when $T_1=0$ or $t_1=T$ and are maximum when $T_1=T/2$.

A major advantage of the invention is that very small filters would be required to cancel these high frequencies. There are no frequencies present between $f_1$ and $f_c-f_1$. Thus if $f_c$ is greater than $f_1$, it is easy to filter out $f_c$ with small filters. This is not only a cost and weight saving but an advantage in that the filters have fast response and permit a fast control loop.

Another advantage of the regulator of the present invention is that the efficiency is quite high because the transistors operate in the switching mode.

The inherent speed of response of the regulator loop is fast because corrections are made at the chopping frequency to the comparator. By using an AC reference which is amplitude controlled and phase locked to the line, it is also possible to correct for transients and waveform distortion.

What is claimed is:

1. An AC voltage regulator for producing a predetermined magnitude AC output voltage, said regulator having input terminals for receiving an AC voltage to be regulated and output terminals to which a load is to be connected for receiving the regulator output voltage, said regulator comprising:
a transformer, having a primary winding series-connected between one terminal of the regulator input and an output terminal and having a center-tapped secondary winding, said center-tap connected to said one regulator input terminal,
means for comparing the voltage at the regulator output terminals with a predetermined reference signal and for producing complementary pulse-width modulated error signals in response to said comparison which includes means for producing a square wave signal, a generator responsive to said square wave signal for producing a sawtooth voltage, a comparator for comparing said reference to said sawtooth waveform and for changing its condition in accordance therewith, and a flip-flop which is set by the comparator output and reset by the square wave signal,
and complementary switch means, responsive to said pulse-width modulated error signals, a respective one of said switch means connected to a point on each side of the center tap of the secondary winding for alternately switching each said point of said secondary to a common potential point of said regulator, each connected portion of said secondary winding between a said respective point and the center tap providing a respective buck or boost voltage to said primary winding determined by the pulse widths of the error signals applied to said complementary switch means to produce a voltage correction signal across the transformer primary and to provide said predetermined output voltage to the regulator output terminals.

2. Apparatus as described in claim 1 wherein said means for developing a square wave signal is an astable multivibrator.

3. An AC voltage regulator for producing predetermined magnitude AC output voltage, said regulator having input terminals for receiving an AC voltage to be regulated and output terminals to which a load is to be connected for receiving the regulator output voltage, said regulator comprising:
a transformer, having a primary winding series-connected between one terminal of the regulator input and an output terminal and having a center-tapped secondary winding, said center-tap connected to said one regulator input terminal,
means for comparing the voltage at the regulator output terminals with a predetermined reference signal and for producing pulse-width modulated error signals which includes means for producing a square wave signal, a comparator for comparing said reference to said output voltage, a phase shifter, responsive to said square wave signal and comparator output, for phase shifting said signal in accordance with the magnitude of said comparator output, and a flip-flop which is set by said square wave signal and reset by said phase shifted signal,
and complementary switch means, responsive to said pulse-width modulated error signals, a respective one of said switch means connected to a point on each side of the center tap of the secondary winding for alternately switching each said point of said secondary to a common potential point of said regulator, each connected portion of said secondary winding between a said respective point and the center tap providing a respective buck or boost voltage to said primary winding determined by the pulse widths of the error signals applied to said complementary switch means to produce a voltage correction signal across the transformer primary and provide said predetermined output voltage to the regulator output terminals.

4. Apparatus as described in claim 3 wherein said reference is a DC source and said output voltage is connected to means for converting said output to a DC signal representing the magnitude of said output voltage to which said comparator is responsive.

5. An AC voltage regulator for producing a predetermined magnitude AC output voltage, said regulator having input terminals for receiving an AC voltage to be regulated and output terminals to which a load is to be connected for receiving the regulator output voltage, said regulator comprising:
a transformer, having a primary winding series-connected between one terminal of the regulator input and an output terminal and having a center-tapped secondary winding, said center-tap connected to said one regulator input terminal,
means for comparing the voltage at the regulator output terminals with a predetermined reference signal and for producing complementary pulse-width modulated error signals in response to said comparison,
complementary switch means comprising a pair of diode bridges each of which is switched by a respective transistor responsive to said pulse-width modulated error signals, a respective one of said switch means connected to a point on each side of the center tap of the secondary winding for alternately switching each said point of said secondary to a common potential point of said regulator, each connected portion of said secondary winding between a said respective point and the center tap providing a respective buck or boost voltage to said primary winding determined by the pulse widths of the error signals applied to said complementary switch means to produce a voltage correction signal across the transformer primary and provide said predetermined output voltage to the regulator output terminals,
transformer means having a full wave rectifier in the secondary thereof for controlling the conduction of a transistor,
and means for driving said transformer means including means for converting said pulse-width modulated error signals to trilevel pulse-width modulated signals wherein said means includes means for phase-shifting said pulse-width modulated signal a predetermined amount, means responsive to said phase-shifted signal for inverting said signal, and means for summing said inverted signal with said original pulse-width modulated signal to produce a trilevel pulse-width modulated signal.